Figures 1, 2:
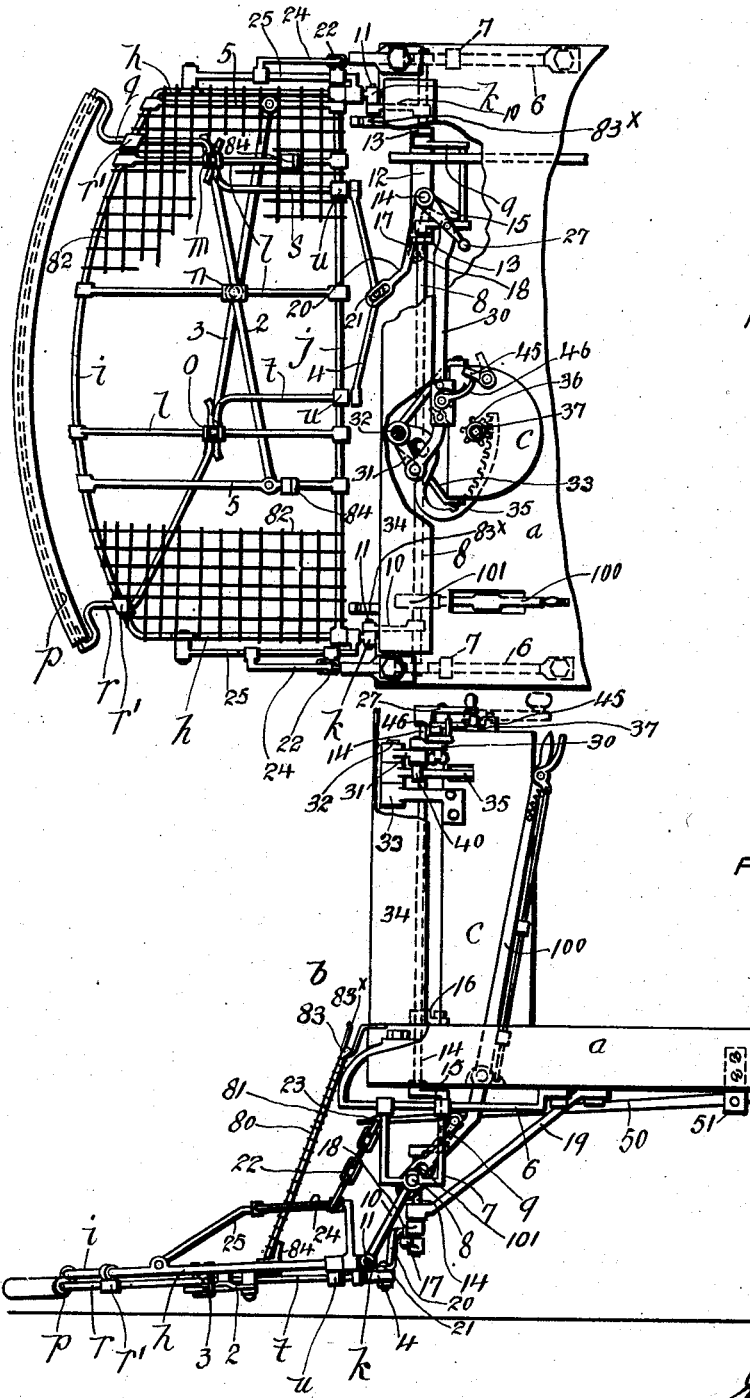

No. 693,239. Patented Feb. 11, 1902.
G. O'K. S. CONWAY.
AUTOMATIC MOTOR CAR LIFE SAVER.
(Application filed Feb. 13, 1901.)
(No Model.) 3 Sheets—Sheet 1.

Witnesses

George O'K. S. Conway
Inventor
By his Attorney

No. 693,239. Patented Feb. 11, 1902.
G. O'K. S. CONWAY.
AUTOMATIC MOTOR CAR LIFE SAVER.
(Application filed Feb. 13, 1901.)
(No Model.) 3 Sheets—Sheet 2.
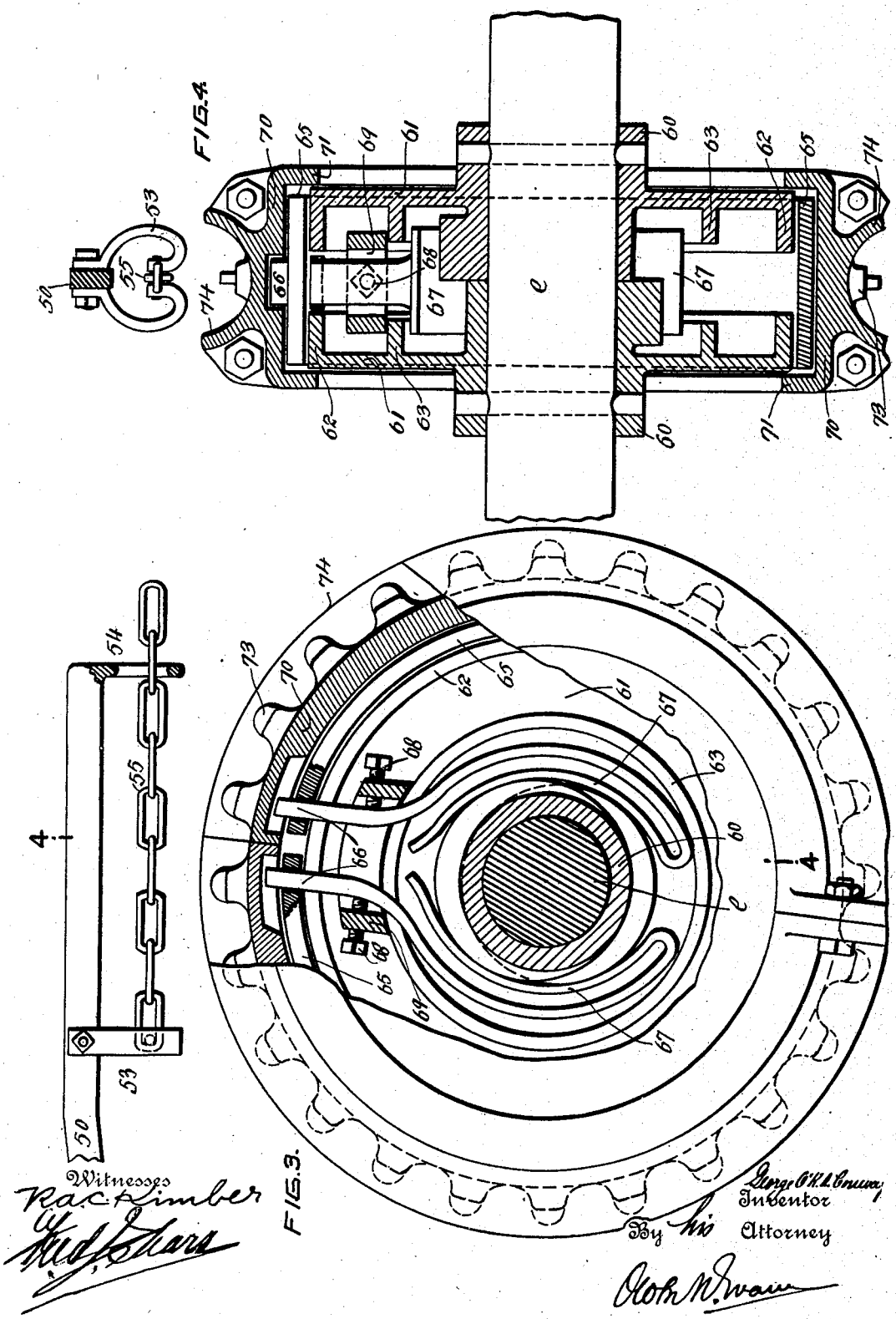

No. 693,239. Patented Feb. 11, 1902.
G. O'K. S. CONWAY.
AUTOMATIC MOTOR CAR LIFE SAVER.
(Application filed Feb. 13, 1901.)
(No Model.) 3 Sheets—Sheet 3.
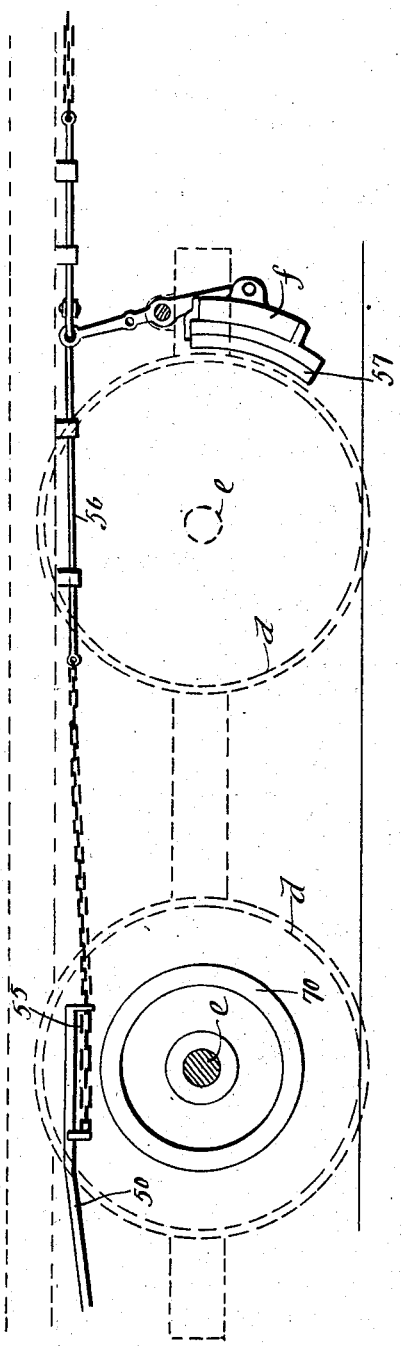
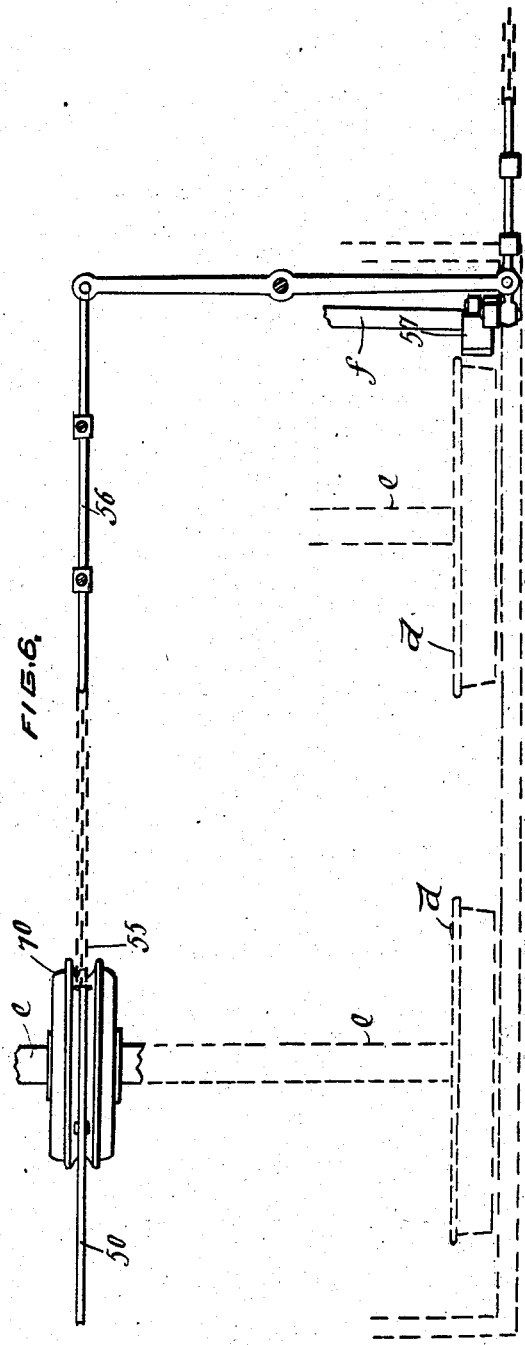
Witnesses
R. a. C. Kimber
George O'K. S. Conway
Inventor
By his Attorney

UNITED STATES PATENT OFFICE.

GEORGE O'KILL STUART CONWAY, OF STONEFIELD, CANADA, ASSIGNOR OF ONE-HALF TO REUBEN HENRY WELDEN, OF MONTREAL, CANADA.

AUTOMATIC MOTOR-CAR LIFE-SAVER.

SPECIFICATION forming part of Letters Patent No. 693,239, dated February 11, 1902.

Application filed February 13, 1901. Serial No. 47,183. (No model.)

*To all whom it may concern:*

Be it known that I, GEORGE O'KILL STUART CONWAY, of Stonefield, in the county of Argenteuil, Province of Quebec, Canada, have invented certain new and useful Improvements in Automatic Motor-Car Life-Savers; and I do hereby declare that the following is a full, clear, and exact description of the same.

My invention has for its object to provide means whereby a car will be automatically arrested upon meeting an object in its path.

The invention may be said, briefly, to consist of a yielding part projecting beyond the front of the car, means for controlling the rotation of the wheels of the car, means for controlling the power for propelling the car, and an operative connection between said yielding part and said means for controlling the rotation of the wheels of the car and the means for controlling the power for propelling the the car whereby upon the yielding of said yielding part the power will be cut off, the brakes applied, and the car brought to a standstill.

More specifically speaking, the invention consists of a forwardly-projecting frame mounted yieldingly on the front of an electric car, a device supported loosely upon the axle which upon the yielding of said frame intermittently contracts said device to grip the said axle and rotate therewith, thereby intermittently winding upon itself a flexible length—such as a chain, wire, or the like—connected to brake-operating gear which it operates to stop the car, and a device operatively connected to said yielding frame to upon the yielding of the frame shut off and reverse the current of electricity that propels the car.

For full comprehension, however, of my invention reference must be had to the accompanying drawings, forming a part of this specification, in which like symbols indicate the same parts, and wherein—

Figure 1 is a plan view with a portion of the covering for the forwardly-projecting yielding frame and a portion of the platform and floor of the car broken away and with the projecting guard or apron removed. Fig. 2 is a side elevation thereof. Fig. 3 is an enlarged side elevation, partly in vertical sectional view. Fig. 4 is a vertical sectional view taken on line 4 4, Fig. 3, and illustrating particularly the interior of the portion of my improved car-controller which grips the axle; and Figs. 5 and 6 are diagrammatical views illustrating in side elevation and plan view, respectively, my operative connection between my improved yielding frame and the brake-gear.

The frame $b$, including platform $a$ of the car, to which the herein-disclosed preferred embodiment of my invention is applied, the controller-box $c$, wheels $d$, axle $e$, and brake-beam $f$ are and may be of usual construction and assembled in the usual way.

My improved frame, the yielding whereof controls the movement of the car, consists of a rectangular frame comprising side rods $h$ and a curved front rod $i$, formed of a single length, and a transverse rear rod $j$, connected rigidly at its ends to the side rods $h$, near the rear ends thereof, which rear ends are in the form of eyes $k$. A series of three guide-rods $l$ are rigidly connected at their ends to said curved front rod $i$ and rear rod $j$, and each has one of three loops $m$, $n$, and $o$ hung therefrom and capable of being slid therealong. A curved feeler-bar $p$ is yieldingly supported in front of the above-described frame upon the forward ends of a pair of slide-rods $q$ and $r$, localized in a pair of eyes $r'$ $r^2$ upon the bottom of the front rod $i$. These slide-rods are offset at their rear ends and have the offset portions passing through and bearing in the respective loops $m$ and $o$, while a second pair of slide-rods $s$ and $t$, offset at their forward ends, have their offset portions also passed through said loops $m$ and $o$ and their rear ends projecting through and guided in a pair of eyes $u$ upon the transverse rear rod $j$.

In order to distribute a pressure upon one end of the feeler-bar throughout the length thereof and enable it and the slide-rods to move freely back and forth, I provide a pair of compensating levers 2 and 3, respectively, each pivoted at one end to one of a pair of stay-bars 5 and both passing through the loop $n$, and the end of lever 2 projecting into the loop $m$, while the end of lever 3 projects into loop $o$. Obviously a pressure upon one end of the feeler-bar will be transmitted, through the adjacent slide-rod, to the loop in which its rear end rests, and, by means of said loop and the lever end projecting thereinto, the loop n, the end of the other lever, the loop through which the end of its other lever projects, and the slide-rod projecting into said last-mentioned loop, to the opposite end of the feeler-bar, and thereby equalizing the pressure throughout it and causing the rods s and t to slide rearwardly through their guide-eyes u. A bent harness-bar 4 is rigidly connected at its ends to the rear ends of said rods s and t. This complete frame, including the feeler-bar, is movable backwardly and forwardly either automatically or manually, as the case may require, and is supported and locked in its forward position by the following means: A pair of rigid brackets are secured to the sides of the platform a and formed with horizontal guiding portions 6, from each of which a swinging bracket 7 is hung. These swinging brackets have their middle portions recessed to afford bearings for a horizontal rod 8, cranked, as at 9, and having a pair of arms 10 rigidly mounted upon its ends and pivotally connected at their ends by pins 11 to the rear ends of the side rods of the yielding frame, while a bridge-piece 12 extends across the cranked portion 9 of the rod and is supported therefrom by a pair of eyes 13.

A vertical shaft 14, cranked, as at 15, on a line with the crank 9, is supported in a bearing 16 on the platform of the car, and the portion thereof below the crank 15 projects through an opening in the bridge-piece 12 and has a laterally-projecting rigid arm 17 upon its lower end, with a vertical pin projection 18, while a brace 19 steadies said lower end. A bent lever-arm 20 is fulcrumed upon the shaft 14 just above the rigid arm 17 and is pivotally connected by a link 21 to the harness-bar at the point of the bend therein. The relative positions of these cranks 9 and 15 are such that when the yielding frame is in its projected position the vertical crank 15 will jam in one corner of the crank 9.

The forward end of the yielding frame is supported off the ground by lengths of chain 22, connected at their upper ends to perforated lugs 23 on the forward sides of the swinging brackets 7 and at their lower ends to rods 24 on the sides of a pair of bracket-frames 25.

The upper end of the vertical shaft 14 is provided with a crank-handle 27, whereby the crank 9 can be disengaged from the crank 15 and the yielding frame be allowed to swing backward or be swung forward.

A flexible guard is pivotally connected at its upper end to the dashboard of the car and rests at its lower end upon the horizontal frame. This guard consists of a metallic open frame 80, filled in with woven material 81, and its function is to extend across the front of the projecting portion of the car in whatever position said frame may be, while the portion of the horizontal frame in front of said guard is also covered with woven material 82.

The guard 80 is provided with a pair of eyes 83, whereby it is hung from a pair of forwardly-projecting hooks $83^\times$ upon the front of the car, while the lower end of said guard rests upon a pair of vertical stops 84.

The power is automatically shut off and the reversing switch-lever is shifted by a link-bar 30, pivotally connected at one end to the under side of the crank-handle 27 and at its other end pivotally to a lever-arm 31, fulcrumed upon a standard 32, supported in a bracket 33 upon the usual controller-box c and projecting between said controller-box and the dashboard 34 of the car. A quadrantal gear 35, with its gear-teeth on the interior thereof, is rotatably mounted upon this standard, and the internal gear-teeth thereof engage a pinion 36 rigidly upon the controller-shaft 37 beneath the cover of the controller-box, while a downwardly-projecting pin 40 upon the under side of the lever-arm 31 engages the radial portion of said quadrantal gear when said arm 31 is moved by the crank-handle 27 through the medium of the link-bar 30 and rotates the controller-shaft to the "shut-off" position. Simultaneously with the shutting off of the current the reversing switch-arm 45 is shifted by a spring-pawl 46, which trips upon said switch-arm and moves it to the position shown in dotted lines. The brakes are also applied simultaneously with the swinging back of the yielding frame, and this is done by the following means: A lever 50 is fulcrumed about midway of its length, as at 51, upon the under side of the car. The end thereof is borne upon by the crank 9, and the rear end thereof is raised and lowered thereby, said rear end having a pair of downwardly-projecting lugs 53 and 54 to constitute a saddle. A length of chain 55 has one end passed through a perforation in the lug 54 and is connected to the other lug 53, and its other end is connected to a draw-rod 56, forming a part of the usual brake-operating gear, of which the brake-beam f and one brake-shoe 57 only are shown. A pair of hub portions 60 are secured rigidly upon the axle beneath said saddle, and each of said hub portions has a disk 61 integral therewith, and each disk has a flange 62, and said flanges project toward one another, the edges thereof being a short space apart. A second flange 63, concentric with the first flange, is cast on the inside of each disk, and a pair of eccentrics diametrically oppositely arranged are cast in one with each hub within the chamber inclosed by said latter flanges and the middle portion of the disks. A band 65 encircles the perimeter constituted by the exterior of the flanges 62, and the ends of said band are slotted and the outer ends 66 of a pair of levers project therethrough, the inner portions whereof are flattened to cause resilience and are bent to form spring ends 67, which bear upon the eccentrics at opposite sides of the hub. These levers fulcrum upon a pair of adjustable screws 68, threaded through tapped perforations in the ends 69 of a rigid loop resting loosely upon the perimeters of the flanges 63, while the outer ends 66 of said levers are of sufficient length to extend into recesses in the interior of an annulus 70. This annulus is of slightly greater diameter than the perimeter 62 with the band 65 loosely thereon, and the edges thereof are inwardly flanged, as at 71, to inclose the edges of the disks 61, while the exterior thereof is formed with sprocket-teeth 73 and annular flanges 74 on each side of said sprocket-teeth. The annulus 70 and all the parts therebetween and the axle normally rotate with the axle.

When the yielding frame is swung back, either automatically by coming in contact with an object or manually, as before explained, the crank 9 will allow the forward end of lever 50 to rise and the rear end thereof to fall, thereby causing the portion of the chain 55 within the saddle to engage the sprocket-teeth and momentarily arrest the rotation of the annulus. The eccentrics then, as they continue to rotate with the axle, will bear upon the resilient lever ends 67 and force the outer ends 66 together, thereby tightening the band upon the perimeter 62 and causing the annulus 70 to rotate with the axle and wind the chain upon itself, with the result that the brake will be applied to the wheels and their rotation stopped. This, however, owing to my arrangement of the eccentrics, will be done intermittently.

From the foregoing it will be seen that by a slight movement of either the feeler-bar or the crank-handle the yielding frame will be swung back and simultaneously the power will be shut off, the power-reversing lever shifted, and the brakes intermittently applied.

A lever 100 is fulcrumed to and extends through the platform of the car and has its lower end 101 forked to straddle the horizontal rod 8 near the end thereof opposite to that near which the crank 9 is formed. By moving the handle of this lever backward and forward the yielding frame can be turned to the left or right, and consequently can be caused to follow the curves in the track.

What I claim is as follows:

1. A universal swinging frame attached to a motor-car suspending a horizontal feeler-bar, that recoils from obstruction the recoil of said feeler-bar acting directly on the switch-off and reversing spindles thereby regulating and controlling the electric current as applied to motor-car propulsion, said oscillating feeler-bar by the same recoil action releasing and immediately applying the brakes by means of a combined self-adjustable friction-pulley sheave attached rigidly to the axle of the motor-car.

2. The combination with a car of a cranked rod extending horizontally and transversely of the front of said car, bearings carried by the car and supporting said horizontal rod, a horizontal frame; a pair of arms connected rigidly at their upper ends to the ends of said horizontal rod and pivotally connected at their lower ends to the rear of said horizontal frame; a vertical rod intersecting the cranked portion of the horizontal rod near one end of said cranked portion, a crank formed in said vertical rod in position to engage said horizontal crank and being of less radius than said horizontal crank and a crank-handle on the upper end of said vertical rod, substantially as described and for the purpose set forth.

3. The combination with a car of a cranked rod extending horizontally and transversely of the front of said car, bearings carried by the car and supporting said horizontal rod, a horizontal frame; a pair of arms connected rigidly at their upper ends to the ends of said horizontal rod and pivotally connected at their lower ends to the rear of said horizontal cranked portion of the horizontal rod near the frame; a vertical rod intersecting one end of said cranked portion a crank formed in said vertical rod in position to engage said horizontal crank and being of less radius than said horizontal crank, a yielding bar extending transversely and in front of said frame, a pair of bearings upon said frame, a pair of sliding rods guided in said bearings and connected at their forward ends to said yielding bar, a lever-arm connected rigidly to said vertical rod and means for connecting said yielding bar to said lever-arm, substantially as described and for the purpose set forth.

4. The combination with a car of a cranked rod extending horizontally and transversely of the front of said car, bearings carried by the car and supporting said horizontal rod; a horizontal frame; a pair of arms connected rigidly at their upper ends to the ends of said horizontal rod and pivotally connected at their lower ends to the rear of said horizontal frame; a vertical rod intersecting the cranked portion of the horizontal rod near one end of said cranked portion a crank formed in said vertical rod in position to engage said horizontal crank and being of less radius than said horizontal crank; a yielding bar extending transversely and in front of said frame, a pair of bearings upon said frame, a pair of sliding rods guided in said bearing and connected at their forward ends to said yielding bar, a lever-arm connected rigidly to said vertical rod, means for connecting said sliding rods to said lever-arm and compensating means for distributing throughout said yielding bar the pressure upon any one point thereof, substantially as described and for the purpose set forth.

5. The combination with a forwardly and backwardly movable frame and movable supports supporting said frame in its forward position, of a pair of sliding rods carried by said frame longitudinally thereof and projecting beyond the front thereof, a bar carried on the front ends of said sliding bars and extending transversely of said frame, a pair of compensating levers crossing one another about midway of their length, a loop loosely connecting said levers together at their point of intersection, a pivotal connection between one end of each of said levers and a rigid part of the frame, means for pivotally connecting the free ends of said levers to said sliding rods with a sliding connection transversely of said sliding rods and means for connecting said sliding rods to said movable supports substantially as described and for the purpose set forth.

6. The combination with a forwardly and backwardly movable frame and movable supports supporting said frame in its forward position, of a pair of sliding rods carried by said frame longitudinally thereof and projecting beyond the front thereof, a bar carried on the front ends of said sliding bars and extending transversely of said frame, the rear ends of said sliding rods being curved, a second pair of sliding rods having their forward ends curved, a harness-bar rigidly connecting the rear ends of said second pair of sliding rods together, a pair of loops inclosing the inner and outer curved ends of said first and second pairs of sliding rods respectively and each loop being connected to the frame by a sliding connection, a pair of compensating levers crossing one another about midway of their length, a loop loosely connecting said levers together at their point of intersection, a pivotal connection between one end of each of said levers and a rigid part of the frame and the free ends of said levers projecting through said pair of loops, and means for connecting said harness-bar to said movable supports, substantially as described and for the purpose set forth.

7. The combination with the vertical controller-shaft of an electric car, of a part projecting beyond the front of the car, means for yieldingly connecting said part to the car, a pinion mounted rigidly upon said controller-shaft, a quadrantal rack interiorly gear-toothed and intermeshing with said pinion and means for operatively connecting said yielding part to said quadrantal gear, substantially as described and for the purpose set forth.

8. The combination with a sheave and rotary rim fixed on the axle of a car, having a lever connection with the projecting feeler-bar, a drop-chain that is drawn not wound, said chain at one end attached to brake lever-arm the other end suspended in bridle, by the depression caused by the projecting of feeler-bar in front of car, said chain being dropped on rotating rim, and applying the brakes, when the feeler-bar is struck as described and set forth.

9. The combination with a car-axle of automatic brake mechanism comprising a yielding part means for mounting said yielding part at the front of the car a pair of disks mounted rigidly upon the axle adjacent to one another, an annular flange formed upon the inside of each disk at the periphery thereof, said annular flanges being collectively of less width than the distance between said disks to provide a space between them, a pair of diametrically oppositely arranged eccentrics formed integrally with said axle between said disk, a pair of levers bearing upon said eccentrics at their inner ends and projecting between and beyond said flanges adjacent to one another, means for fulcruming said levers inside of said flanges, a band encircling said flanges and connected at its ends to the projecting ends of said levers, an annulus freely encircling said flanges and band and interiorly recessed to receive the ends of said levers a series of sprocket-teeth formed integral with the exterior of said annulus a pair of annular flanges formed integral with the exterior of said annulus one on each side of said series of sprocket-teeth, a lever fulcrumed to the under side of the car, and having its rear end extending over said sprocket-toothed annulus a length of chain carried by said rear end of said lever, means for connecting said chain to the brake-beam, and means for operatively connecting the forward end of said lever to said yielding part, substantially as described and for the purpose set forth.

In testimony whereof I have affixed my signature in presence of two witnesses.

GEORGE O'KILL STUART CONWAY.

Witnesses:
FRED J. SEARS,
FRANK H. DENMAN.